United States Patent
Na

(10) Patent No.: US 8,840,014 B2
(45) Date of Patent: Sep. 23, 2014

(54) IDENTIFICATION CODE PROCESSING SYSTEM, IDENTIFICATION CODE PROCESSING METHOD THEREOF, AND APPARATUS FOR SUPPORTING SAME

(75) Inventor: Seung Won Na, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 0 days.

(21) Appl. No.: 14/006,562

(22) PCT Filed: Mar. 21, 2012

(86) PCT No.: PCT/KR2012/001995
§ 371 (c)(1),
(2), (4) Date: Sep. 20, 2013

(87) PCT Pub. No.: WO2012/128538
PCT Pub. Date: Sep. 27, 2012

(65) Prior Publication Data
US 2014/0008428 A1    Jan. 9, 2014

(30) Foreign Application Priority Data
Mar. 24, 2011  (KR) .................. 10-2011-0026432

(51) Int. Cl.
| G06F 17/00 | (2006.01) |
| G06K 7/00 | (2006.01) |
| G06K 19/00 | (2006.01) |
| G06Q 30/00 | (2012.01) |
| G06Q 30/02 | (2012.01) |
| H04N 1/00 | (2006.01) |
| H04M 1/725 | (2006.01) |

(52) U.S. Cl.
CPC *G06K 7/00* (2013.01); *G06K 19/00* (2013.01); *G06Q 30/02* (2013.01); *H04N 1/00* (2013.01); *H04M 1/7255* (2013.01)
USPC .................. 235/375; 705/14.1; 705/14.38

(58) Field of Classification Search
CPC ................. G06K 7/00; G06K 19/00
USPC ............................. 705/14.1, 14.38
See application file for complete search history.

(56) References Cited

U.S. PATENT DOCUMENTS

| 8,317,086 B2* | 11/2012 | Dudek et al. ............. 235/375 |
| 2004/0096123 A1* | 5/2004 | Shih et al. ............. 382/305 |

(Continued)

FOREIGN PATENT DOCUMENTS

| JP | 2002135451 | 5/2002 |
| JP | 2005071290 | 3/2005 |

(Continued)

OTHER PUBLICATIONS

International Search Report for PCT/KR2012/001995, citing the above reference(s).

*Primary Examiner* — Christle I Marshall
*Assistant Examiner* — Claude J Brown
(74) *Attorney, Agent, or Firm* — Lowe Hauptman & Ham, LLP.

(57) ABSTRACT

The present invention relates to an identification code processing system, an identification code processing method thereof, and an apparatus for supporting the same. The present invention supports various multi-codes for a specified object to be generated using a terminal and additional information of the object to be collected, integrated, and shared by applying the generated multi-codes online and offline. A terminal recognizes a base identification code of an object, and generates and stores or transmits multi-codes on the basis of base identification information included in the base identification code. In addition, a service apparatus classifies and stores the multi-codes transmitted by the terminal, and supports the multi-codes to be circulated in at least one network device and to be regenerated as multi-codes including various additional information.

18 Claims, 6 Drawing Sheets

(56) References Cited

U.S. PATENT DOCUMENTS

| | | | |
|---|---|---|---|
| 2007/0119955 A1* | 5/2007 | Barenburg et al. | 235/494 |
| 2008/0048044 A1* | 2/2008 | Zhao et al. | 235/494 |
| 2008/0275760 A1* | 11/2008 | Easterly et al. | 705/10 |
| 2009/0250512 A1* | 10/2009 | Deck et al. | 235/375 |
| 2010/0063872 A1* | 3/2010 | Patel et al. | 705/14.1 |
| 2010/0084469 A1* | 4/2010 | Kuyper-Hammond et al. | 235/462.01 |
| 2010/0280918 A1* | 11/2010 | Balent | 705/26 |
| 2011/0011926 A1* | 1/2011 | Matsumoto | 235/375 |
| 2011/0208659 A1* | 8/2011 | Easterly et al. | 705/79 |
| 2011/0238473 A1* | 9/2011 | Sankolli et al. | 705/14.23 |
| 2012/0029994 A1* | 2/2012 | Barkan et al. | 705/14.25 |
| 2012/0185398 A1* | 7/2012 | Weis et al. | 705/75 |

FOREIGN PATENT DOCUMENTS

| | | |
|---|---|---|
| KR | 1020070098059 | 10/2007 |
| KR | 1020080071334 | 8/2008 |

\* cited by examiner

IDENTIFICATION CODE PROCESSING SYSTEM, IDENTIFICATION CODE PROCESSING METHOD THEREOF, AND APPARATUS FOR SUPPORTING SAME

TECHNICAL FIELD

The present invention relates to processing of an identification code used for storing information and, particularly, to identification code processing system and method, together with an apparatus supporting the same, which create various multi-codes on the basis of a basic identification code and also, based on such multi-codes, support sharing and comparing information about an object containing the basic identification code.

BACKGROUND ART

With a remarkable growth of related technologies, a great variety of mobile devices are increasingly popularized in these days. Particularly, mobile devices today outgrow their respective traditional fields and hence reach a mobile convergence stage. A mobile communication terminal which is a typical mobile device has various functions such as a TV watching function (e.g., mobile broadcasting such as DMB (Digital Multimedia Broadcasting) or DVB (Digital Video Broadcasting)), a music play function (e.g., MP3 (MPEG Audio Layer-3)), a digital camera function, and an Internet access function as well as normal communication functions such as a voice call function or a message transmission and reception function.

In particular, many devices have a function to recognize a barcode and, by recognizing a barcode printed on products, provide a function to inform a user of basic information about such products. Through these functions, a user of a conventional device can obtain various kinds of information about a certain product on which a barcode is printed, and then make a purchase decision with regard to that product. However, a barcode recognition function of a conventional device merely supports a search for basic information about products, thus unfavorably resulting in a lowering of utilization. Further, since a user may passively obtain only basic information about products with a barcode printed, new ways of actively and widely utilizing code recognition technology are required.

DETAILED DESCRIPTION OF THE INVENTION

Technical Problems

Accordingly, the present invention is proposed to solve the above-mentioned problems. An object of the present invention is to provide an identification code processing system, an identification code processing method thereof, and an apparatus supporting the same, all of which allow creating various multi-codes for a specific object on the basis of a basic identification code, sharing the created multi-codes on a network, and also collecting, combining and sharing additional information about the object through the network.

Technical Solutions

As one solution, the present invention provides an identification code processing system that includes a device configured to recognize a basic identification code contained in an object and, based on basic identification information contained in the basic identification code, to create multi-codes including at least one type of code; and a service apparatus configured to receive and share the created multi-codes through a network and, when at least one kind of additional information associated with the object occurs, to reproduce the multi-code to contain the additional information.

Additionally, as another solution, the present invention provides a service apparatus for supporting identification code processing that includes a code processing apparatus configured to receive multi-codes created by a device on the basis of a basic identification code contained in an object, and to reproduce the multi-codes to contain at least one kind of additional information associated with the object; and at least one sub-apparatus configured to receive the multi-codes from the code processing apparatus, to share the received multi-codes in a network, and when the at least one kind of additional information associated with the object occurs, to provide the additional information to the code processing apparatus.

In the service apparatus, the code processing apparatus may include a communication unit configured to communicate with the device and the at least one sub-apparatus; at least one database configured to classify and store the multi-codes; and a control unit configured to control reproduction and collection of the multi-codes.

In the service apparatus, the code processing apparatus may be further configured to extract the additional information from the multi-codes and to reproduce new multi-codes in which the extracted additional information and basic identification information contained in the multi-codes are incorporated.

In the service apparatus, the code processing apparatus may be further configured to allocate URL information to the multi-codes, the URL information indicating a location at which the multi-codes are posted.

In the service apparatus, the sub-apparatus may be further configured to provide at least one webpage at which the multi-codes are posted.

The service apparatus may further includes at least one of a gateway apparatus configured to act as a port for outputting the multi-codes as actual multi-codes; and code issuing equipment connected to the gateway apparatus and configured to issue the actual multi-codes.

In the service apparatus, at least one of the code processing apparatus and the sub-apparatus may be constructed as one or more servers that operate in a cloud computing environment.

Additionally, as still another solution, the present invention provides a device for supporting identification code processing that includes a camera configured to capture an image of a basic identification code contained in an object; a control unit configured to extract basic identification information by recognizing the basic identification code and to create at least one type of multi-codes by adding additional information to the extracted basic identification information; and a memory unit configured to store the created multi-codes.

In the device, the control unit may include an image collecting unit configured to activate the camera and to collect an image corresponding to the basic identification code; and a multi-code creating unit configured to extract the basic identification information by recognizing the basic identification code and to create the multi-codes on the basis of the extracted basic identification information and the additional information added in response to user's manipulation.

In the device, the image collecting unit may be further configured to analyze a preview image of the basic identification code received from the camera and to automatically determine a capturing time of the camera when the analyzed image meets recognizable conditions.

In the device, the multi-code creating unit may be further configured to select the additional information added to the basic identification information for each code according to code attributes.

The device may further include a communication unit configured to transmit the multi-codes to a service apparatus through a network, wherein the control unit may further include a multi-code transmitting/receiving unit configured to control the communication unit to transmit the created multi-codes to the code processing apparatus and to receive reproduced multi-codes or additional information associated with the object from the service apparatus in response to user's request.

Additionally, as yet another solution, the present invention provides an identification code processing method that includes, at a device, extracting basic identification information by recognizing basic identification code contained in an object; at the device, creating multi-codes including at least one type of code by adding additional information to the extracted basic identification information; and at the device, storing the created multi-codes.

Further, the present invention provides a computer-readable medium recording thereon a program executing the above method.

Advantageous Effects

As mentioned above, according to the identification code processing system and method and related apparatus in embodiments of the present invention, it is possible to capture an image of a basic identification code printed on an object by using a device having a camera, then create multi-codes associated with the object on the basis of the basic identification code, and share the created multi-codes online. It is therefore possible to create and possess multi-codes for an object in real time without restrictions on time or location and further allow the acquisition of various kinds of information by sharing multi-codes containing additional information.

Additionally, when a certain user creates multi-codes, this invention may support the integration and sharing of information by allowing the multi-codes to be distributed online and also reproduced as new multi-codes containing other additional information.

MODE FOR CARRYING OUT THE INVENTION

Figure 1:
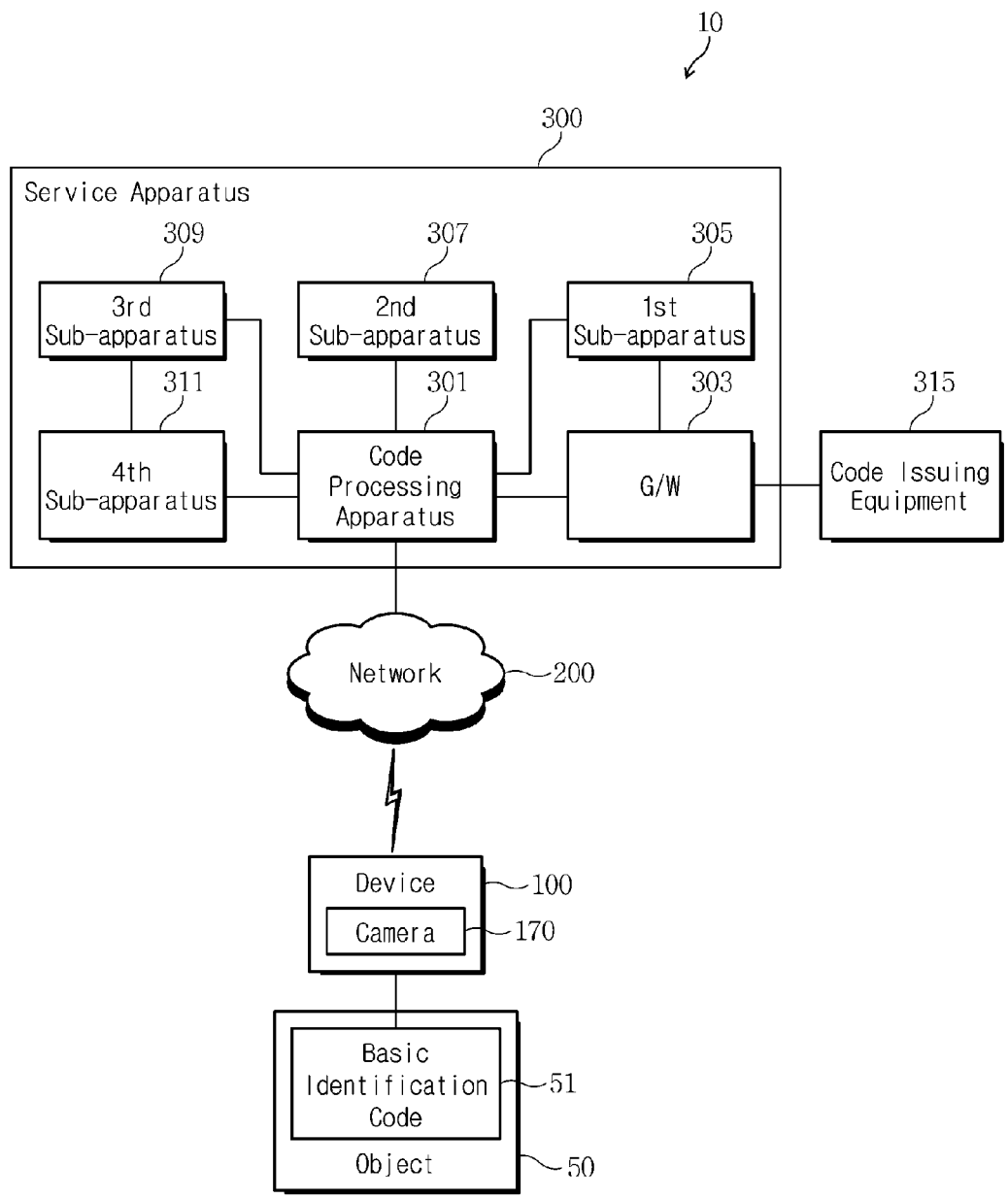
FIG. 1 is a view schematically illustrating the configuration of an identification code processing system in accordance with an embodiment of the present invention.

Hereinafter, preferred embodiments of the present invention will be fully described with reference to the accompanying drawings. In such drawings, the same elements will be designated by the same reference numerals. Furthermore, well known functions and configurations may not be described or illustrated in detail to avoid obscuring the essence of the present invention.

Meanwhile, this invention may be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

FIG. 1 is a view schematically illustrating the configuration of an identification code processing system in accordance with an embodiment of the present invention.

Referring to FIG. 1, the identification code processing system 10 in an embodiment of this invention may include a basic identification code 51 contained in an object 50, a device 100, a network 200, and a service apparatus 300, and may further include any other offline supporting device, e.g., code issuing equipment 315, connected to the service apparatus 300.

Using the device 100, the identification code processing system 10 having the above configuration collects the basic identification code 51 from the object 50 and then creates multi-codes on the basis of the collected basic identification code 51. Such multi-codes may be stored in a memory unit 150 of the device 100 and also transmitted to the service apparatus 300 through the network 200 in response to user's manipulation. Therefore, the identification code processing system 10 can easily perform the creation of multi-codes for the object 50 and, based on the multi-codes, support sharing of various kinds of information about the object 50 in the service apparatus 300. Now, each element of the identification code processing system 10 will be described in detail.

The object 50 may be a certain product or article on or to which the basic identification code 51, e.g., one of various types of identification codes, is printed, installed or attached. The basic identification code 51 contained in the object 50 may include basic identification information about the object 50. For example, the basic identification information may include the manufacturing date and manufacturer of the object 50, the transaction price or suggested retail price of the object 50, and any other inherent information about the object 50.

The device 100 recognizes the basic identification code 51 contained in the object 50 by taking an image thereof through an embedded camera 170, and then creates multi-codes by extracting basic identification information from the basic identification code 51. Herein, multi-codes refer to a number of codes having different forms, including for example at least one of a one-dimensional barcode, a two-dimensional QR code, a matrix code, a color code, and any other image code. Then the device 100 not only stores the created multi-codes in the memory unit 150, but also transmits them to the service apparatus 300 in response to user's manipulation. Additionally, the device 100 may transmit the stored multi-codes to other devices. Also, after creating the multi-codes, the device 100 may access the service apparatus 300 and then receive additional information about the object 50 by using the created multi-codes. Such received additional information may be outputted to a display unit or stored in the memory unit in response to user's manipulation. And also, the device 100 may support an edit process for the received additional information, depending on format of multi-codes.

Creating and processing multi-codes in the device 100 will be described more fully with reference to FIGS. 2 and 3.

The network 200 establishes a communication channel between the device 100 and the service apparatus 300 and supports the exchange of data. The network 200 may be one of networks that support various communication types. For example, the network 200 may include one or more of IP network which provides a mass data transmission service and a seamless data service through IP (Internet Protocol), All-IP network which refers to an IP network structure that combines different networks on the basis of IP, wired network, Wibro (Wireless broadband) network, 3-generation mobile communication network including WCDMA, 3.5-generation mobile communication network including HSDPA (High Speed Downlink Packet Access) network and LTE network, 4-generation mobile communication network including LTE-advanced, satellite communication network, and Wi-Fi network.

The network 200 may be connected to the service network 300, especially, a code processing apparatus 301. Thus, through a connection between the device 100 and the code processing apparatus 301, the network 200 may deliver various kinds of information from the device 100 to the code processing apparatus 301, and vice versa. Particularly, the network 200 may deliver multi-codes from the device 100 to the code processing apparatus 301, and also deliver a specific multi-code from the code processing apparatus 301 to the device 100 in response to a request of the device 100.

The service apparatus 300 includes several sub-apparatuses 305, 307, 309 and 311 and the code processing apparatus 301, and processes, reproduces or disposes of information associated with multi-codes, provided by the device 100 or more, through internal procedures of delivering, sharing, modifying and discarding information. The sub-apparatuses 305, 307, 309 and 311 are connected to each other through their network equipment to allow data transmission and reception, and may perform tasks such as modifying their possessing information by checking changes in the transmitted or received data. Particularly, the code processing apparatus 301 in the service apparatus 300 may have database that classifies multi-codes delivered from the device 100 according to their code attributes, and may also support management and update of information about the object 50 indicated by each multi-code. Additionally, the code processing apparatus 301 may propagate multi-codes stored in the sub-apparatuses 305, 307, 309 and 311, and may also collect, classify and store multi-codes being distributed online by the sub-apparatuses 305, 307, 309 and 311. Although four sub-apparatuses 305, 307, 309 and 311 are used, this is exemplary only and not to be considered as a limitation. Alternatively, for example, two or more sub-apparatuses may be used.

Particularly, the respective sub-apparatuses 305, 307, 309 and 311 may be specific apparatuses that support various web sites, e.g., electronic commerce sites or portal sites, or provide blogs or homepages of specific users or groups. The sub-apparatuses 305, 307, 309 and 311 may post thereon information about the object 50 associated with specific multi-codes, and may also provide such information about the object 50 to users through various computing devices such as the device 100 or any other device, e.g., PC, capable of access to the service apparatus 300. Additionally, each of the sub-apparatuses 305, 307, 309 and 311 may support an update of multi-codes for the object 50 in response to the sale of the object 50 and the entry of additional information by users. Namely, when any additional information regarding the specific object 50 occurs, the sub-apparatuses 305, 307, 309 and 311 may convert multi-codes for the object 50 into codes containing such additional information. Then such converted multi-codes may be delivered to the code processing apparatus 301.

Additionally, the code processing apparatus 301 may store therein multi-codes which are equal to those stored in the device 100, and may also add, to such multi-codes, additional information being distributed online in connection with such multi-codes in the service apparatus 100 to classify and store it as sharing information. Namely, the code processing apparatus 301 may further collect information about the object 50 associated with multi-codes from the sub-apparatuses 305, 307, 309 and 311, and provide further collected information to the device 100 upon request. For this, the code processing apparatus 301 may include a communication unit for communicating with the device 100 and the sub-apparatuses 305, 307, 309 and 311, at least one database for classifying and storing multi-codes, and a control unit for supporting the distribution of stored multi-codes and the collection and storage of distributed multi-codes.

When information about the object 50 associated with specific multi-codes is received from the device 100, the code processing apparatus 301 may update, by using the received information, stored information about the object 50 associated with the specific multi-codes. In this process, the code processing apparatus 301 may support reissuing multi-codes for the object 50. For this, the code processing apparatus 301 may allocate address information, e.g., URL information, linked to multi-codes for the object 50. URL information may be an address of a web page, blog or electronic commerce site that provides various types of information, i.e., basic information and additional information to be added in response to a sale, search, etc. of the object 50, about the object 50 indicated by the multi-codes. Besides, the code processing apparatus 301 may support MMS transmission, URL transmission, Web posting, electronic commerce link, etc. of multi-codes for the object 50.

Meanwhile, the service apparatus 300 may further include a gateway apparatus 303 that supports outputting actual forms of multi-codes in offline environments. In this invention, the gateway apparatus 303 is an element that can output multi-codes, being distributed in an online state in the service apparatus 300, to offline environments in conjunction with the code issuing equipment 315. Therefore, the gateway apparatus 303 may be treated as one port, rather than a separate unit, capable of outputting multi-codes as actual multi-codes in offline environments. Further exemplary descriptions about the service apparatus 300 will be given later in connection with the device 100.

As discussed hereinbefore, the identification code processing system 10 can create multi-codes on the basis of basic identification information contained in the basic identification code recognized by the device 100, deliver the created multi-codes to the service apparatus 300 to collect and share various kinds of information about the multi-codes. When the basic identification code 51 is converted into multi-codes, a user of the device 100 can add additional information to be provided as sharing information such that information about the object 50 indicated by the basic identification code 51 can be accumulated and shared. Also, the identification code processing system 10 not only can collect, classify and store information about commercial transaction or search for the object 50 indicated by multi-codes such that information associated with multi-codes being distributed online can be shared, but also can, if necessary, output such multi-codes as actual multi-codes in offline environments. Therefore, the identification code processing system 10 can expand the utilization of the object 50, merely existing as the basic identification code 51 containing basic identification information only, to the form of multi-codes recognized and utilized in various device and computing environments and offline environments, so that a user can easily obtain various kinds of information about the object 50 through at least one of the multi-codes about the object 50 regardless of the compatibility of devices.

Figure 2:
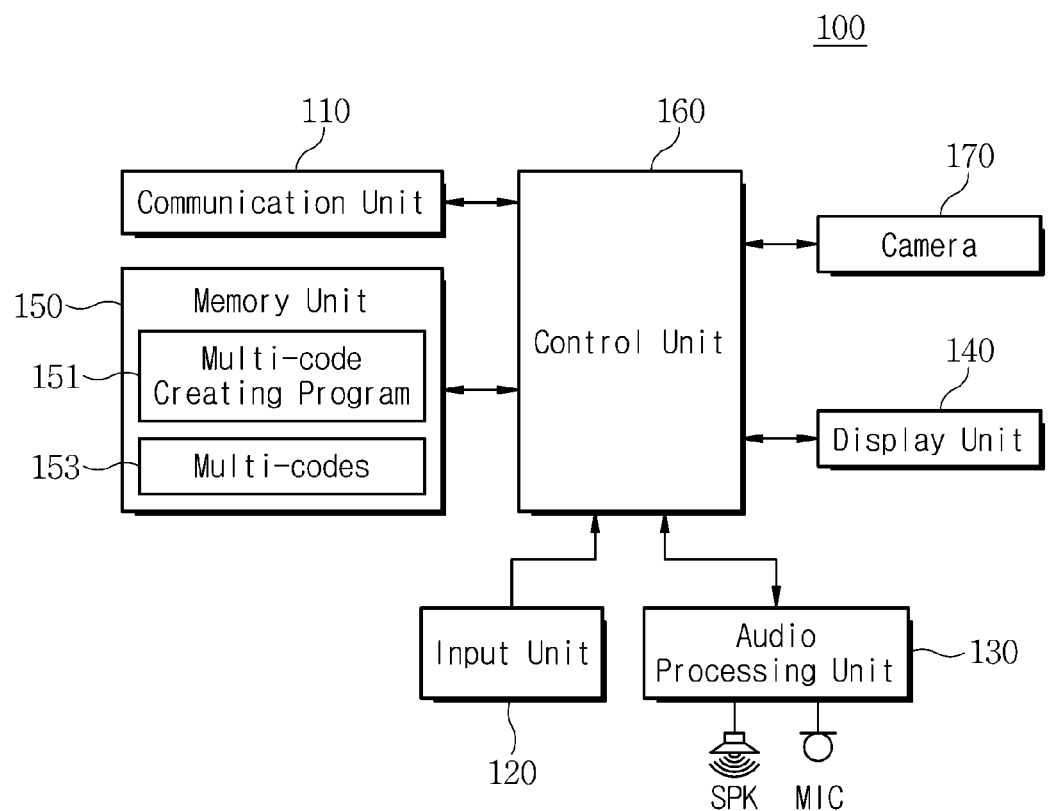
FIG. 2 is a view specifically illustrating the configuration of a device in accordance with an embodiment of the present invention.

FIG. 2 is a block diagram schematically illustrating the configuration of the device 100 in accordance with an embodiment of the present invention.

Referring to FIG. 2, the device 100 in this invention basically includes a camera 170, a control unit 160 and a memory unit 150, and may further include a communication unit 110, an input unit 120, an audio processing unit 130 and a display unit 140. Meanwhile, as mentioned above, multi-codes refer to various forms of multi-codes including a one-dimensional barcode, a two-dimensional QR code, a two-dimensional matrix code, a three-dimensional code (a hologram code), a color code, and any other image code. Such multi-codes provide the compatibility of code identification by devices and the basis of information sharing. For this, multi-codes may contain address (URL) information for retrieving information about the object 50. Further, multi-codes may store blog information, LBS information, a phone number, address information, and the like.

The device 100 having the above configuration may capture an image of the basic identification code 51 by operating the camera 170, create various kinds of multi-codes 153 on the basis of basic identification information contained in the basic identification code 51, and store them in the memory unit 150. Further, the device 100 may transmit the multi-codes 153 to the service apparatus 300 or any other device. Thereafter, by checking additional information about the multi-codes 153 from the service apparatus 300, the device 100 may collect various kinds of information about the object 50, e.g., sales information associated with sales volume or sales price, transaction state information, location information, product evaluation, product use history information, consumer preference, and the like. Such additional information may be contained in the multi-codes 153. Now, as to the creation, delivery and processing of multi-codes, the role and function of each element in the device 100 will be described in detail.

The communication unit 110 establishes a communication channel for data transmission of the device 100 under the control of the control unit 160. Namely, the communication unit 110 establishes a data communication channel with the service apparatus 300 through the network 200. For this, the communication unit 110 may include a radio frequency (RF) transmitter (not shown) that up-converts the frequency of outgoing signals and amplifies such signals, an RF receiver (not shown) that amplifies with low-noise incoming signals and down-converts the frequency of such signals, and the like. Particularly, the communication unit 110 may form a communication channel for transmitting, to the code processing apparatus 301, multi-codes created on the basis of the basic identification code 51. Additionally, the communication unit 110 may receive, from the code processing apparatus 301, sharing information containing additional information associated with multi-codes in response to user's request. Such received information may be delivered to the control unit 160.

The input unit 120 may include input keys and function keys to receive various numeral or literal inputs and receive user's instructions for setting or controlling various functions of the device 100. For example, the input unit 120 may include a call key for requesting a voice call, a video call key for requesting a video call, an end key for ending a voice or video call, a volume key for regulating an output volume of audio signals, navigation keys, and any other special keys. Particularly, the input unit 120 may create an input signal associated with a control of the camera 170 for capturing an image of the basic identification code 51, an input signal for storing and transmitting multi-codes created on the basis of the basic identification code 51, an input signal for forming a communication channel with the code processing apparatus 301 and then receiving additional information associated with multi-codes from the code processing apparatus 301, and the like. Such input signals created by the input unit 120 may be transmitted to the control unit 160 and converted into commands for performing particular functions corresponding to such input signals. The input unit 120 may be formed of one or combinations of various input devices such as a touch pad, a touch screen, a button-type keypad having a normal key array, a qwerty-type keypad, a gesture input device, and a voice-based input device.

The audio processing unit 130 may have a speaker (SPK) and a microphone (MIC) for outputting various audio data occurring at processing steps of the device 100 and for collecting audio data. The audio processing unit 130 may output sound effects required for processing steps of the camera 170 through the speaker (SPK), and may also output sound effects associated with the execution of specific functions at the creation, transmission and store of multi-codes. This function to output sound effects may be omitted depending on user's selection.

The display unit 140 displays various menu items of the device 100 and information received from or provided to a user. Namely, the display unit 140 may offer various screens associated with the use of the device 100, e.g., an idle screen, a menu screen, a message writing screen, a call screen, and the like. Particularly, the display unit 140 may output a screen associated with the camera 170 activated for collecting an image of the basic identification code 51, e.g., a preview image output screen regarding the basic identification code 51. Also, when multi-codes are created on the basis of the basic identification code 51, the display unit 140 may output a screen regarding such multi-codes. And also, the display unit 140 may output basic identification information associated with the basic identification code 51 at step of recognizing the basic identification code 51, and output additional information associated with multi-codes received from the code processing apparatus 301. The display unit 140 may be formed of LCD (Liquid Crystal Display), OLED (Organic Light Emitted Diode), AMOLED (Active Matrix OLED), and the like. Additionally, in case of being formed as a touch screen, the display unit 140 may perform a function of the input unit 120.

The memory unit 150 may store the OS (Operating System) of the device 100, applications required for specific functions, e.g., a sound output function, an image viewer function, a video playback function, etc., various user data, transmitted or received data, and the like. Particularly, the memory unit 150 may store a multi-code creating program 151 for supporting the creation of multi-codes, and also store such multi-codes 153 created by the multi-code creating program 151.

The multi-code creating program 151 recognizes the basic identification code 51 collected by the camera 170, and then creates the multi-codes 153 having various forms, e.g., a one-dimensional code, a two-dimensional QR code, a two-dimensional matrix code, a three-dimensional code, a color code, and any other image code, by integrating all of basic identification information obtained from recognition results, numeral and literal information inputted through the input unit 120 by a user, and specific image or logo information stored in the memory unit 150. Meanwhile, the basic identification code 51 collected by the camera 170 may be one of various codes such as a one-dimensional barcode, a two-dimensional matrix code, a color code, and the like. The multi-code creating program 151 may include one or more of a routine for extracting basic identification information from an image of a code captured by the camera, a routine for creating a plurality of new multi-codes by integrating the extracted basic identification information and information inputted by a user of the device 100, and a routine for transmitting the created multi-codes to the code processing apparatus 301 in response to user's request. Here, user input information added to basic identification information may include various types of information such as text information written by a user, image or logo information, object-related information including the manufacturing date and manufacturer of the object 50 and any other information about the object 50, URL address information used for an upload of multi-codes, current location information of the object 50, and phone number information. Such user input information as additional information contained in multi-codes may be propagated to the service apparatus 300 through the code processing apparatus 301 and edited again or added as additional information by other users.

The multi-codes 153 includes various codes created by the multi-code creating program 151, and a difference in information input may be caused according to code attributes. This difference in information entry by codes is to consider both the compatibility of any device recognizing the multi-codes 153 and a difference in the amount of information contained in the multi-codes 153. For example, a one-dimensional barcode may contain only basic identification information associated with the object 50, and a two-dimensional matrix code or QR code may further contain additional information such as text, image or logo associated with the object 50 in addition to basic identification information. Also, a color code or the like may contain much more information in comparison with a QR code, etc., and a three-dimensional code or the like may be formed of hologram or the like to be used as a security code, for example, by a security function added according to any usage purpose of the multi-codes 153. Like this, the multi-codes 153 which are formed of many codes for storing various kinds of information about the object 50 not only may allow various apparatuses to share information about the object 50, but also may support a browse and search for much more information relying upon respective recognition devices and code attributes. After being created by the device 100, the multi-codes 153 may be stored and managed in the code processing apparatus 301, and also changed to any special form to store much more data by adding additional information which occurs while the multi-codes are distributed through the service apparatus 300. For this, the code processing apparatus 301 may classify the multi-codes 153 received from the device 100 into codes according to their types and then, in response to a request from the sub-apparatus 305, 307, 309 or 311, transmit the multi-codes 153 to the requesting sub-apparatus 305, 307, 309 or 311. The multi-codes 153 transmitted to each sub-apparatus 305, 307, 309 or 311 may contain additional information based on characteristics of the sub-apparatus 305, 307, 309 or 311 or added by the sub-apparatus 305, 307, 309 or 311. Then such additional information may be provided for update to the code processing apparatus 301 periodically or in response to a request from the code processing apparatus 301. The updated multi-codes 153 may be transmitted again to the sub-apparatuses 305, 307, 309 and 311. Through the above process, the service apparatus 300 may reproduce the distributed multi-codes as new multi-codes by updating their information and adding any user's written information thereto such that a much wider variety of information can be shared.

The camera 170 is a device for capturing an image of any subject. The camera 170 may include an image sensor and an image processing unit. The image sensor is a specific sensor that converts an optical image of the subject into electrical image signals. The image sensor may be a CMOS (Complementary Metal Oxide Semiconductor) image sensor or a CCD (Charge Coupled Device) image sensor. The image processing unit is a device for processing an image inputted from the image sensor and then outputting the processed image. Namely, the image processing unit may perform various image processing functions such as image resizing, image transfer between memories, RGB signal conversion, A/D conversion, noise removal, digital zoom, rotation, encoding, and the like. Particularly, the camera 170 in an embodiment of this invention may capture an image of the basic identification code 51 contained in the object 50. Then the captured image of the basic identification code 51 may be transmitted to the control unit 160.

The control unit 160 may control the whole operations of the device 100 and a signal flow between internal blocks of the device 100, and also perform a data processing function. Particularly, the control unit 160 may support a multi-code creating function by executing the multi-code creating program 151. For this, the control unit 160 may have configurations as shown in FIG. 3.

Figure 3:
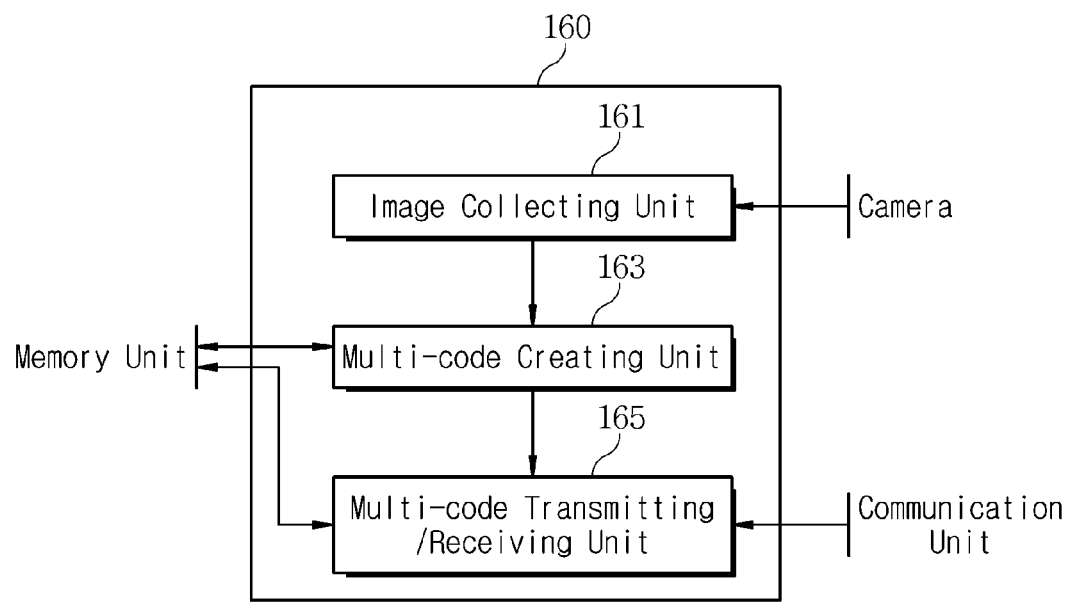
FIG. 3 is a view specifically illustrating the configuration of a control unit in the device shown in FIG. 2.

FIG. 3 is a view specifically illustrating the configuration of the control unit 160 in accordance with an embodiment of the present invention.

Referring to FIG. 3, the control unit 160 may include an image collecting unit 161, a multi-code creating unit 163, and a multi-code transmitting/receiving unit 165.

The image collecting unit 161 is configured to collect an image corresponding to the basic identification code 51 for the creation of the multi-codes 153. For this, the image collecting unit 161 activates the camera 170 when an input signal for activating a multi-code creating function is received from the input unit 120 or the display unit 140 having a touch screen function. While the camera 170 collects images of the basic identification code 51 in the form of preview images, the image collecting unit 161 may automatically determine a capturing time of the camera 170 when any image meets recognizable conditions. Namely, the image collecting unit 161 may recognize the basic identification code 51 collected in a preview form, create a signal for activating an automatic shutter key when any image meets recognizable conditions, and control an image capturing. For image recognition of the basic identification code 51 in a preview state, the image collecting unit 161 may either include an identification code recognition program designed to recognize the basic identification code 51 or call a recognition function of the multi-code creating unit 163 to be discussed below. Also, the image collecting unit 161 transmits an image collected by the camera 170 to the multi-code creating unit 163.

The multi-code creating unit 163 is configured to analyze an image received from the image collecting unit 161 and then create the multi-codes 153 on the basis of analysis results. For this, the multi-code creating unit 163 may check whether an image received from the image collecting unit 161 corresponds to an image of the basic identification code 51. Namely, the multi-code creating unit 163 analyzes a received image to determine which one of a one-dimensional barcode, a two-dimensional matrix code, a QR code, and a color code corresponds to the received image, and then performs recognition of the analyzed code. For this, the multi-code creating unit 163 may load a suitable recognition program for a selected code from the memory unit 150. Recognition programs for respective codes may be either contained in the multi-code creating program 151 or stored as a separate program, depending on the intention of a designer of the device 100. When the basic identification code 51 is recognized, the multi-code creating unit 163 extracts information from the basic identification code 51 and, based on the extracted information, creates various multi-codes. At this time, the multi-code creating unit 163 may output basic identification information to the display unit 140 and also output an input window for entry of additional information. Then a user can add various kinds of user input information through the input window. As discussed above, user input information which refers to information inputted arbitrarily by a user may include various types of information such as text information, image information and logo information, and may also include URL information or specific blog information, phone number information, web connectivity information or specific web portal information, location information of the object 50, or the like, depending on any usage purpose of the multi-codes. Such multi-codes may have various types, and the amount of information may be varied according to types of multi-codes. Additionally, the multi-codes created by the multi-code creating unit 163 may be outputted to the display unit 140 or stored in the memory unit 150. Further, such multi-codes may be transmitted to the multi-code transmitting/receiving unit 165 in response to user's request.

The multi-code transmitting/receiving unit 165 is configured to transmit, to the code processing apparatus 301, the multi-codes received from the multi-code creating unit 163. As discussed above, the code processing apparatus 301 is configured to store online the multi-codes created by the device 100 and to collect, classify, integrate and distribute various kinds of information about the stored multi-codes. Thus, the code processing apparatus 301 may propagate the multi-codes to the service apparatus 300 and collect information about the propagated multi-codes to update the stored multi-codes. Namely, the code processing apparatus 301 may update the stored multi-codes when any information about specific multi-codes is changed. Also, if a request for such information about specific multi-codes is received from the device 100, the code processing apparatus 301 may transmit the updated multi-code to the device 100. In this process, the multi-code transmitting/receiving unit 165 may perform a role of receiving the multi-codes 153 from the code processing apparatus 301. The multi-codes received by the multi-code transmitting/receiving unit 165 may be stored in the memory unit 150 and recognized by a code recognition program contained in the multi-code creating unit 163. Such recognized information, i.e., sharing information, may be outputted to the display unit 140 in response to user's request. Also, the multi-codes stored in the memory unit 150 may be replaced with new multi-codes on the basis of recognized information, or transmitted to the multi-code creating unit 163 to reproduce new multi-codes containing sharing information. Such reproduced multi-codes may be stored in the memory unit 150 and selectively transmitted again to the code processing apparatus 303, depending on user's manipulation.

As discussed hereinbefore, the identification code processing system 10 according to an embodiment of the present invention may extract basic identification information by recognizing the basic identification code 51 about the object 50 through the device 100, and create various multi-codes by selectively adding additional information to the extracted basic identification information. The created multi-codes may be stored in the device 100 and also transmitted to the service apparatus 300 such that other users can share them and add various kinds of information to utilize information about the object 50 on the basis of the multi-codes 153.

Meanwhile, the above-discussed service apparatus 300 may be constructed as one or more servers that operate in a server-based computing environment or a cloud computing environment. Specifically, the service apparatus 300 may be constructed as one or more servers each of which has separately or as a whole the code processing apparatus 301 and the sub-apparatuses 305, 307, 309 and 311. Further, the service apparatus 300 may provide a multi-code processing service to the device 100 in a cloud computing environment.

Here, a cloud computing refers to a technique to offer, on demand, IT resources virtualized using Internet technology, e.g., hardware (i.e., server, storage, network, etc.), software (i.e., database, security, web, etc.), service, data, and the like. Namely, the service apparatus 300 provides the device 100 with computing resources including one or more of hardware, software, service and data which are required for processing multi-codes. For example, the service apparatus 300 may offer to the device 100 a virtual computing space in which multi-codes are distributed, and may also update such multi-codes as new multi-codes by adding additional information to multi-codes through the computing space. Additionally, the service apparatus 300 may offer a storage space for storing data and/or software associated with multi-codes, and perform the above-discussed functions through the storage space.

Hereinbefore, the identification code processing system 10 in an embodiment of the present invention has been described. Hereinafter, processing methods respectively implemented at the terminal 100 and the identification code processing system 10 will be described with reference to drawings.

Figure 4:
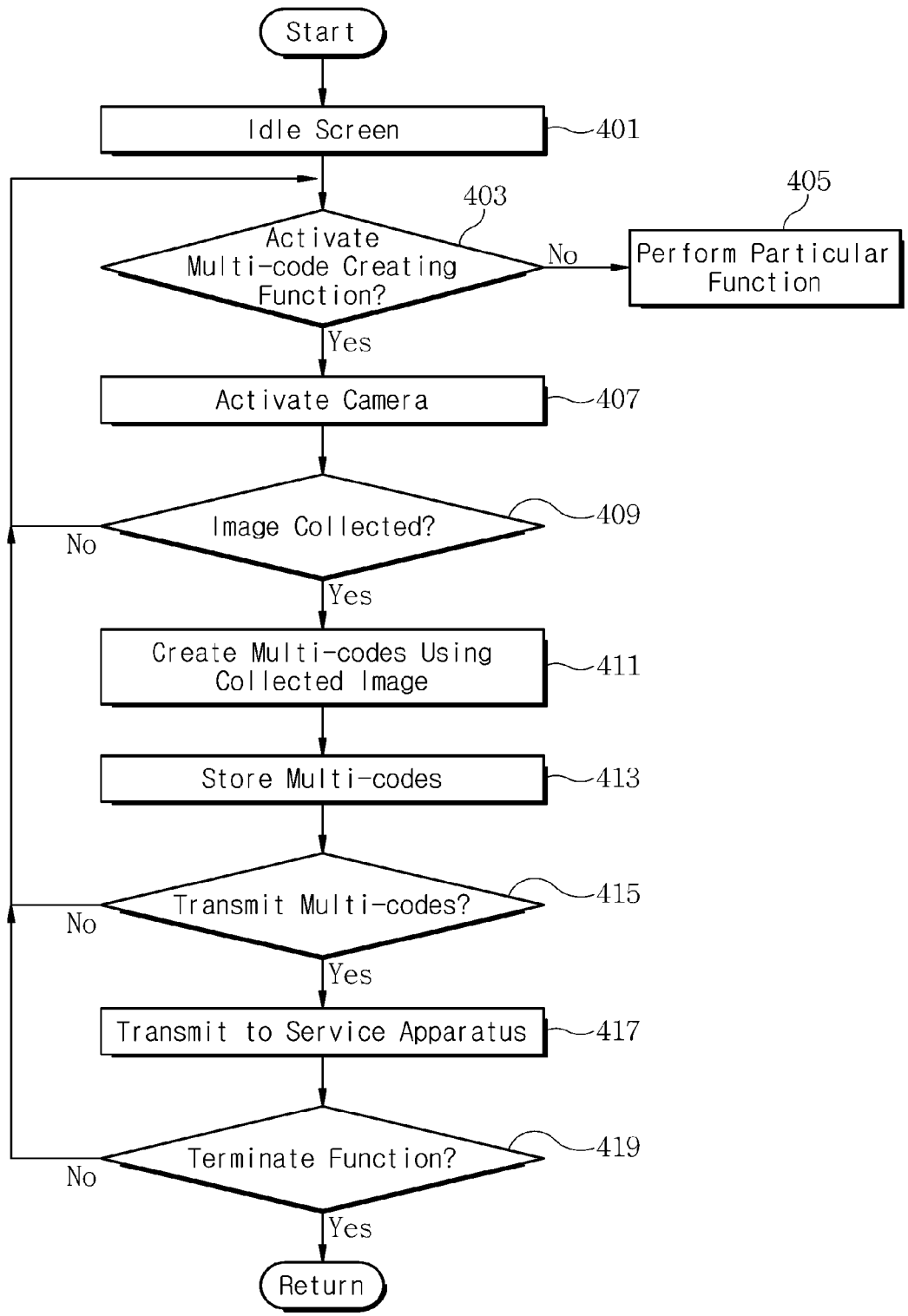
FIG. 4 is a flow diagram illustrating an identification code processing method of a device in accordance with an embodiment of the present invention.

FIG. 4 is a flow diagram illustrating an identification code processing method of a device in accordance with an embodiment of the present invention.

Referring to FIG. 4, at the outset, when electric power is supplied to the device 100, the control unit 160 controls an initialization process of respective elements of the device 100 by using supplied power. Then, after the initialization process is completed, the control unit 160 may control at step 401 the display unit 140 to output an idle screen according to pre-defined schedule information.

Next, when an input signal is received from the input unit 120 or the display unit 140 having a touch screen function, the control unit 160 may check at step 403 whether the received input signal is for activating a multi-code creating function. If the input signal is not for a multi-code creating function, the control unit 160 may control at step 405 the device 100 to perform a particular function thereof corresponding to the input signal, e.g., a file play function, a file search function, a broadcast receiving function, a call function, or the like.

If any input signal for a multi-code creating function is received at step 403, the control unit 160 may activate the camera 170 at step 407. At this time, the control unit 160 may control an automatic setting of the activated camera 170 for capturing an image of the basic identification code 51. Unlike normal image capturing environments, environments for capturing an image of the basic identification code 51 may require a close-up function or need an ambient lighting regulating function or a pixel correcting function for recognition of a QR code or a color code. Thus, if the camera 170 has a sensor for sensing ambient illumination values, the control unit 160 may perform automatic setting of illumination values for capturing an image of the basic identification code 51 on the basis of illumination values collected from the sensor, and control automatic setting of a close-up function. Additionally, the control unit 160 may control automatic setting of pixel or color correction of the camera 170, depending on illumination values.

Next, at step 409, the control unit 160 may determine whether a collection of an image corresponding to the basic identification code 51 is completed. Actually, the control unit 409 may check whether an input signal corresponding to a shutter key used for collecting images is received. If there is no input signal at this step, the control unit may return to step 407 or, after a certain time period, return to step 403.

After an image collection is completed at step 409, the control unit 160 may create multi-codes on the basis of the collected image at step 411. Specifically, the control unit 160 recognizes the basic identification code 51 which corresponds to one of various types, and then extracts basic identification information from the code. Additionally, the control unit 160 may check whether additional information to be added to the extracted basic identification information is inputted from the input unit 120 or the display unit 140, and then add such additional information to the basic identification information to create various types of multi-codes. As discussed above, multi-codes may include a one-dimensional barcode, a two-dimensional matrix code, a QR code, a three-dimensional code, a color code, and any other image code, and information stored may be varied depending on the amount of storable information in each code. Namely, a one-dimensional barcode may contain only basic identification information, and a two-dimensional matrix code may contain additional information including numbers or letters in addition to basic identification information. Also, a QR code may contain numbers, letters, images or logo information in addition to basic identification information, and a three-dimensional code may contain security information in addition to both basic identification information and additional information.

The multi-codes created at 411 step may be stored in the memory unit 150 at step 413 in response to user's manipulation. Then, at step 415, the control unit 160 may check whether an input signal for transmitting multi-codes is received. If there is no input signal for transmission of multi-codes or if a default mode defines no transmission of multi-codes, the control unit 160 may return to step 403. If any input signal is received for transmission of multi-codes or if a default mode defines transmission of multi-codes to the code processing apparatus 301, the control unit 160 may control such multi-codes to be transmitted to the code processing apparatus 301 at step 417.

Thereafter, at step 419, the control unit 160 may check at step 419 whether an input signal for terminating a multi-code function is received. If there no such input signal, the control unit 160 may return to step 403 followed by steps 407 and 409. If there occurs any terminating input signal, the control unit 160 may terminate a multi-code creating function and then return to step 401.

Figure 5:
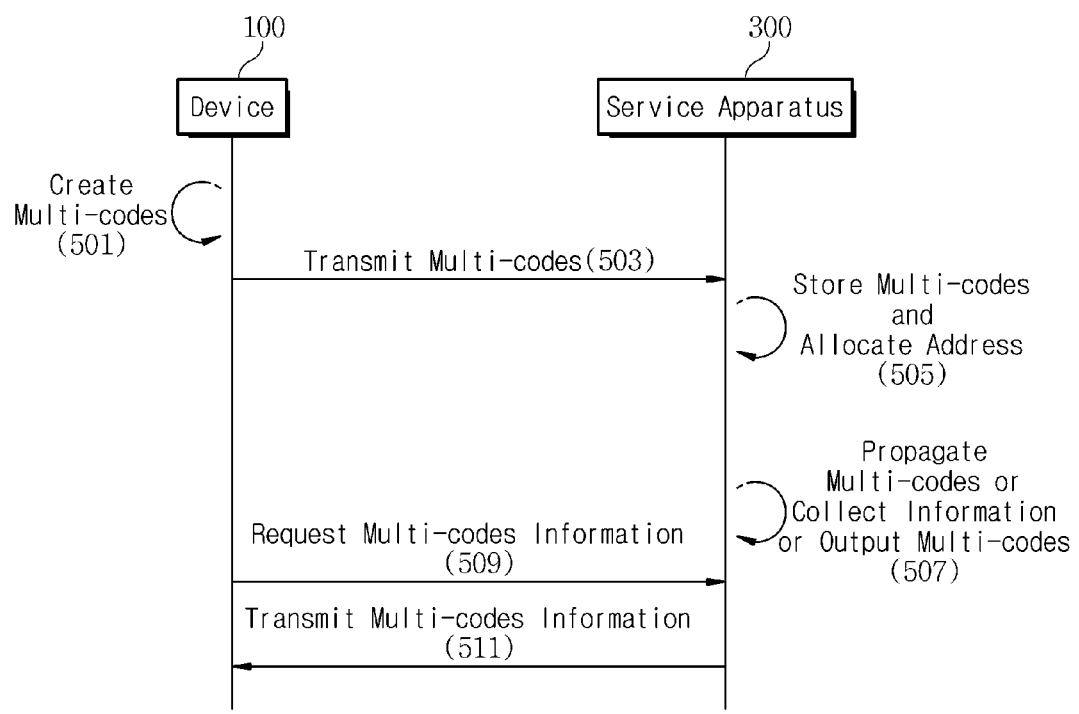
FIG. 5 is a view illustrating a signal flow between elements in an identification code processing method in accordance with an embodiment of the present invention.

FIG. 5 is a view showing a signal flow between elements of the identification code processing system 10 in order to illustrate an identification code processing method in accordance with an embodiment of the present invention.

Referring to FIG. 5, at the outset, the device 100 creates multi-codes at step 501. Since operations of step 501 are equal to those of steps 403 to 411 in FIG. 4, detailed description thereof is skipped.

Next, at step 503, the device 100 may transmit the created multi-codes 153 to the service apparatus 300 in response to user's manipulation or as a default mode. Particularly, the device 100 may transmit the multi-codes to the code processing apparatus 301 for classifying, storing, managing and updating the multi-codes in the service apparatus 300. In another embodiment of this invention, the device 100 may request the creation of the multi-codes 153, without creating multi-codes, by transmitting the collected basic identification code 51 to the service apparatus 300, especially the code processing apparatus 301, so that the code processing apparatus 301 can process the received basic identification code 51 and thereby directly create various multi-codes.

At step 505, the code processing apparatus 301 may classify the received multi-codes 153 by their types and then store them. Further, the code processing apparatus 301 may check additional information contained in the multi-codes and, if any address information such as specific blog information, web address information or email information is contained, may transmit at least one of the multi-codes to such address information. Additionally, at step 507, the code processing apparatus 301 may deliver the stored multi-codes to at least one of the sub-apparatuses 305, 307, 309 and 311, depending on a policy of network equipment. Also, the code processing apparatus 301 may output multi-codes to offline environments through the gate apparatus 303. The gate apparatus 303 may be connected to the code issuing equipment 315 provided at a place such as newspaper or magazine publishing companies for printing multi-codes and thereby producing printed matters, and the code issuing equipment 315 may print multi-codes on a certain area of printed matters.

If no web address information is contained in the multi-codes, the code processing apparatus 301 may allocate, in addition to additional information and identification information, URL information to be used for finding and obtaining sharing information accumulated through the distribution of the multi-codes 153. Also, the code processing apparatus 301 may dispose various kinds of information associated with the multi-codes 153 in such URL information. In this case, the code processing apparatus 301 may dispose various types of multi-codes containing the identical basic identification information on a webpage indicated by URL information such that a visiting user can obtain, from multi-codes, various kinds of information about the object 50 indicated by the basic identification information. And also, the code processing apparatus 301 may provide a specific webpage that allows users to find respective multi-codes and additional information contained in such multi-codes. Multi-codes provided by the code processing apparatus 301 may include various multi-codes reproduced to have additional information which is added by users to initial multi-codes being distributed through the service apparatus 300. Meanwhile, URL information not only can be used for providing multi-code information as discussed above, but also can be contained in multi-codes when it is defined for a user to insert URL information having specific information, e.g., image or audio information, into multi-codes at the creation of initial multi-codes. These multi-codes may be transmitted to other devices or uploaded to blogs or the like, depending on user's manipulations.

As discussed above, multi-codes created by the device 100 may be updated as new multi-codes to have additional information which is added by users of various devices when the multi-codes are being distributed on a cloud computing system of the service apparatus 300. For example, multi-codes may be registered in various online shopping malls and, based on various kinds of information about the corresponding object 50 such as users' comments, sales volume, or sales price, may be evolved into more valuable information for users.

Meanwhile, at step 509, the device 100 may send a request for information about a specific multi-code to the code processing apparatus 301, separately from a multi-code creating function. For example, a user can search for a desired multi-code after access to the service apparatus 300 through the device 100. In this case, if a user requests information retrieval about the multi-code, the device 100 may transmit information about the requested multi-code to the code processing apparatus 301. Then, at step 511, the code processing apparatus 301 may check whether there is any multi-code having the same basic identification information as the requested multi-code and further having additional information, or collect information about webpages allocated for the requested multi-code and then provide it to the device 100. At this step, multi-codes stored in the code processing apparatus 301 may be in an updated state beyond an initial state created by the device 100 as having additional information added by users while being distributed through the service apparatus 300. Then the code processing apparatus 301 may directly transmit at least parts of various multi-codes in response to a request from the device 100, or create a new multi-code by collecting information stored in other multi-codes associated with the requested multi-code and then transmit the new multi-code to the device 100. Eventually, this received multi-code may be an integrated multi-code of various kinds of additional information.

As discussed hereinbefore, the identification code processing method can reproduce multi-codes by adding additional information about the object 50 indicated by the basic identification code 51 in the device 100, and also update such reproduced multi-codes by incorporating further additional information while the multi-codes are distributed through the service apparatus 300 formed of a cloud computing system structure. As a result, various kinds of information such as user information, address information or text information can be incorporated to the multi-codes 153, thus allowing a user to use multi-codes for various purposes.

The device processing method and identification code processing method in embodiments of this invention may be implemented as program commands that can be executed by various computer means and written to a computer-readable recording medium. The computer-readable recording medium may include a program command, a data file, a data structure, etc. alone or in combination. The program commands written to the medium are designed or configured especially for the disclosure, or known to those skilled in computer software.

Examples of the computer-readable recording medium include magnetic media such as a hard disk, a floppy disk, and a magnetic tape, optical media such as a CD-ROM and a DVD, magneto-optical media such as a floptical disk, and a hardware device configured especially to store and execute a program command, such as a ROM, a RAM, and a flash memory. Program commands may include machine language codes made by a complier and high-level language codes executable in a computer using an interpreter or the like. These hardware devices may be configured to operate as one or more of software to perform the operation of this invention, and vice versa.

Figure 6:
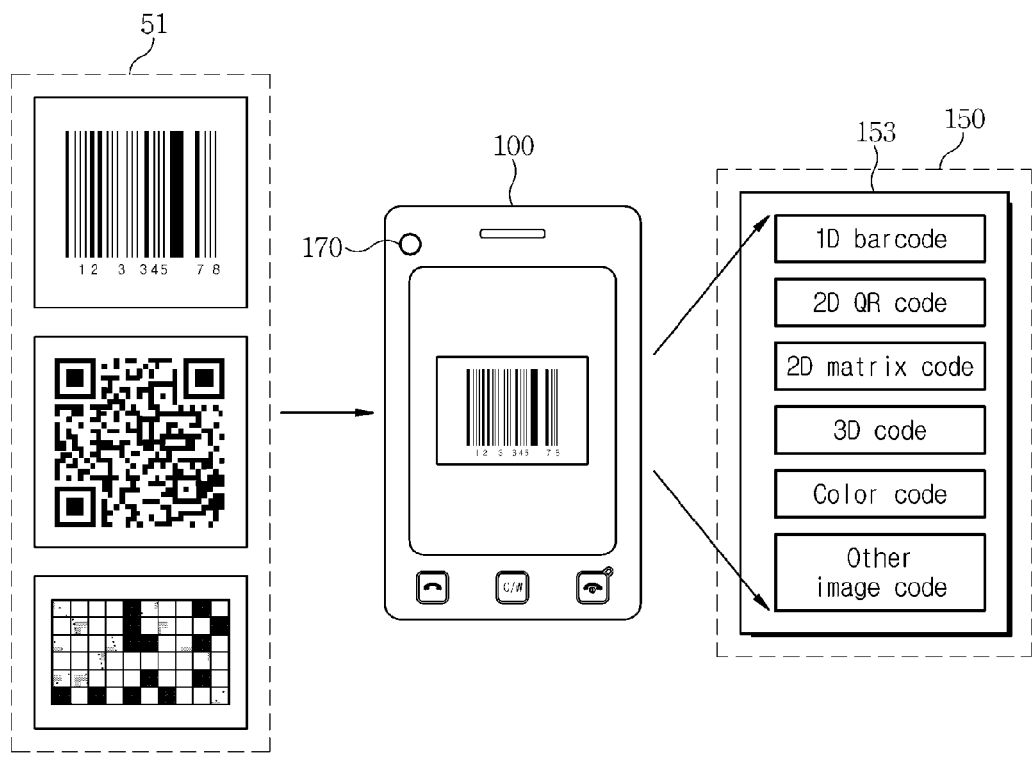
FIG. 6 is a view specifically illustrating the creation of multi-codes in accordance with an embodiment of the present invention.

Now, the creation of multi-codes will be described with examples. As shown in FIG. 6, the device 100 may capture, using the camera 170, an image of the basic identification code 51 contained in the object 50 and transmit the captured image to the control unit 160. As shown, the basic identification code 51 contained in the object 50 may be at least one of various codes such as a one-dimensional barcode, a two-dimensional QR code and a color code. A user can activate the camera 170 of the device 100 and manipulate the camera 170 to capture an image of the basic identification code 51.

Then the control unit 160 of the device 100 may recognize the basic identification code 51, create various types of multi-codes 153, i.e., a one-dimensional code, a two-dimensional QR code, a two-dimensional matrix code, a three-dimensional code, a color code and any other image code as shown in FIG. 6, by using the multi-code creating unit 163, and store them in the memory unit 150. Additionally, the control unit 160 may transmit the created multi-codes 153 to the service apparatus 300 such that the multi-codes 153 are distributed and updated to have much more various kinds of information.

Meanwhile, although FIG. 6 shows the basic identification code 51 as a one-dimensional barcode, a two-dimensional QR code and a color code, this is exemplary only and not to be considered as a limitation of the invention. Alternatively, at least one of other codes may be the basic identification code 51, and just one of the shown codes may be applied. In addition, although the multi-codes 153 are shown as including all of a one-dimensional code, a two-dimensional QR code, a two-dimensional matrix code, a three-dimensional code, a color code and any other image code, the multi-code creating unit 163 of the control unit 160 may create only specific ones of the above codes as the multi-codes 153, depending on designer's intention or user's setting. For example, the multi-code creating unit 163 may create, as the multi-codes 153, a one-dimensional code, a two-dimensional QR code, a color code and a three-dimensional code only.

While this invention has been particularly shown and described with reference to an exemplary embodiment thereof, it will be understood by those skilled in the art that various changes in form and details may be made therein without departing from the spirit and scope of the invention as defined by the appended claims.

INDUSTRIAL APPLICABILITY

The present invention relates to system, method and device for processing an identification code, which allow adding various kinds of additional information about a specific object by processing multi-codes and support sharing various kinds of information about the object by integrating and reproducing such additional information. Therefore, it may be possible to collect and check more exact information in purchase, recommendation and use of objects, to perform a systematic classification of information through a multi-code processing for information sharing, and to support a selective processing of specific type multi-codes according to usage purposes.

The invention claimed is:

1. An identification code processing system, comprising:
 a device configured to recognize a basic identification code contained in an object and, based on basic identification information contained in the basic identification code, to create multi-codes including at least one type of code, to transmit the created multi-codes to a service apparatus, and to receive updated multi-codes from the service apparatus, the updated multi-codes containing further additional information associated with the object; and
 the service apparatus configured to receive and share the multi-codes created by the device through a network and, when the further additional information associated with the object occurs, to update the received multi-codes to contain the further additional information.

2. A service apparatus for supporting identification code processing, comprising:
 a code processing apparatus configured to receive multi-codes created by a device on the basis of a basic identification code contained in an object, and to update the received multi-codes to contain further additional information associated with the object; and at least one sub-apparatus configured to receive the multi-codes or the updated multi-codes from the code processing apparatus, to share the received multi-codes or the updated multi-codes in a network, and when the further additional information associated with the object occurs, to provide the further additional information to the code processing apparatus to update the multi-codes.

3. The service apparatus of claim 2, wherein the code processing apparatus includes:

a communication unit configured to communicate with the device and the at least one sub-apparatus;

at least one database configured to classify and store the received multi-codes or the updated multi-codes; and a control unit configured to control updating and collection of the multi-codes.

4. The service apparatus of claim 3, wherein the code processing apparatus is further configured to extract the additional information from the received multi-codes, and to update the multi-codes, wherein the said updated multi-codes include the extracted additional information and basic identification information contained in the received multi-codes, and the further additional information associated with the object.

5. The service apparatus of claim 4, wherein the code processing apparatus is further configured to allocate URL information to the received multi-codes, the URL information indicating a location at which the received multi-codes are posted.

6. The service apparatus of claim 2, wherein the at least one sub-apparatus is further configured to provide at least one webpage at which the received multi-codes are posted.

7. The service apparatus of claim 2, further comprising:

a gateway apparatus configured to act as a port for outputting the received multi-codes as actual multi-codes.

8. The service apparatus of claim 7, further comprising:

code issuing equipment connected to the gateway apparatus and configured to issue the actual multi-codes.

9. The service apparatus of claim 2, wherein at least one of the code processing apparatus and the at least one sub-apparatus is constructed as one or more servers configured to operate in a cloud computing environment.

10. A device for supporting identification code processing, comprising:

a camera configured to capture an image of a basic identification code contained in an object;

a control unit configured to extract basic identification information by recognizing the basic identification code and to create multi-codes by adding additional information to the extracted basic identification information;

a memory unit configured to store the created multi-codes; and a communication unit configured to transmit the created multi-codes to an external apparatus and to receive updated multi-codes from the external apparatus, the updated multi-codes containing further additional information associated with the object.

11. The device of claim 10, wherein the control unit includes:

an image collecting unit configured to activate the camera and to collect an image corresponding to the basic identification code; and a multi-code creating unit configured to extract the basic identification information by recognizing the basic identification code and to create the multi-codes on the basis of the extracted basic identification information and the additional information added in response to user's manipulation.

12. The device of claim 11, wherein the image collecting unit is further configured to analyze a preview image of the basic identification code received from the camera and to automatically determine a capturing time of the camera when the analyzed image meets recognizable conditions.

13. The device of claim 11, wherein the multi-codes include at least one selected from the group consisting of a one-dimensional code, a two-dimensional QR code, a two-dimensional matrix code, a color code, and a three-dimensional code.

14. The device of claim 11, wherein the multi-code creating unit is further configured to select the additional information added to the basic identification information for each code according to code attributes.

15. The device of claim 10, wherein the control unit further includes a multi-code transmitting/receiving unit configured to control the communication unit to transmit the created multi-codes to the external apparatus and to receive the updated multi-codes or additional information associated with the object from the external apparatus in response to user's request.

16. The device of claim 10, wherein the additional information includes at least one selected from the group consisting of text information, image information, logo information, URL information, address information, phone numbers, and blog information.

17. An identification code processing method performed by a device, the method comprising:

extracting basic identification information by recognizing a basic identification code contained in an object;

creating multi-codes including at least one type of code by adding additional information to the extracted basic identification information;

storing the created multi-codes;

transmitting the created multi-codes to an external apparatus; and receiving new multi-codes from the external apparatus, the new multi-codes containing further additional information associated with the object.

18. A non-transitory computer-readable medium recording a program for causing a device for supporting identification code processing to execute an identification code processing method, the method comprising:

extracting basic identification information by recognizing basic identification code contained in an object;

creating multi-codes including at least one type of code by adding additional information to the extracted basic identification information;

storing the created multi-codes;

transmitting the created multi-codes to an external apparatus; and receiving new multi-codes from the external apparatus, the new multi-codes containing further additional information associated with the object.

* * * * *